US009966619B2

United States Patent
Libis et al.

(10) Patent No.: US 9,966,619 B2
(45) Date of Patent: May 8, 2018

(54) AIRCRAFT ENERGY MANAGEMENT SYSTEM FOR MULTI FUNCTIONAL FUEL CELLS

(71) Applicant: Zodiac Aerotechnics, Plaisir (FR)

(72) Inventors: Jean-Paul Libis, Bievres (FR); Franck Masset, Saint Georges Motel (FR); Yannick Brunaux, Croix (FR)

(73) Assignee: Zodiac Aerotechnics, Plaisir (FR)

( * ) Notice: Subject to any disclaimer, the term of this patent is extended or adjusted under 35 U.S.C. 154(b) by 139 days.

(21) Appl. No.: 14/761,105

(22) PCT Filed: Jan. 15, 2014

(86) PCT No.: PCT/IB2014/058297
§ 371 (c)(1),
(2) Date: Jul. 15, 2015

(87) PCT Pub. No.: WO2014/111861
PCT Pub. Date: Jul. 24, 2014

(65) Prior Publication Data
US 2015/0364780 A1    Dec. 17, 2015

Related U.S. Application Data

(60) Provisional application No. 61/752,586, filed on Jan. 15, 2013, provisional application No. 61/753,548, filed on Jan. 17, 2013.

(51) Int. Cl.
*H01M 8/00* (2016.01)
*H01M 8/04992* (2016.01)
(Continued)

(52) U.S. Cl.
CPC ........ *H01M 8/04992* (2013.01); *B64D 41/00* (2013.01); *H01M 8/04955* (2013.01);
(Continued)

(58) Field of Classification Search
CPC ......... H01M 8/04955; H01M 8/04992; H01M 8/0656; H01M 8/2498; H01M 2250/405; B64D 2041/005; Y02T 90/36; Y02T 90/32
See application file for complete search history.

(56) References Cited

U.S. PATENT DOCUMENTS

| 7,693,609 B2 * | 4/2010 | Kressner ................. B60L 11/14 320/109 |
| 8,141,185 B2 | 3/2012 | Hoffjann et al. |

(Continued)

FOREIGN PATENT DOCUMENTS

| CA | 2700658 A1 | 4/2009 |
| CN | 101068716 A | 11/2017 |

(Continued)

OTHER PUBLICATIONS

International Patent Application No. PCT/IB2014/058297, Preliminary Report on Patentability dated Jul. 30, 2015.
(Continued)

*Primary Examiner* — Mark F. Huff
*Assistant Examiner* — Monique M Wills
(74) *Attorney, Agent, or Firm* — Kilpatrick Townsend & Stockton LLP; Dean W. Russell; Kristin M. Crall

(57) ABSTRACT

Disclosed is an aircraft resource management system. The system may include at least one fuel cell cluster having at least one fuel cell system configured to receive and convert a hydrogen input comprising hydrogen and an oxygen input comprising a fluid having an initial oxygen content so as to yield a number of products. The products can include water, thermal energy, an oxygen-depleted product comprising the fluid having a second oxygen content lower than the initial oxygen content, and electrical power. The system may include at least one load cluster with at least one load configured to utilize at least one product of the fuel cell
(Continued)

cluster. The system may compare a demand level of the load cluster with a supply level of the fuel cell cluster and manage operating levels of the fuel cell cluster based at least in part on the comparison.

11 Claims, 10 Drawing Sheets

(51) Int. Cl.
*H01M 8/04955* (2016.01)
*H01M 8/0656* (2016.01)
*H01M 8/249* (2016.01)
*B64D 41/00* (2006.01)

(52) U.S. Cl.
CPC ......... *H01M 8/0656* (2013.01); *H01M 8/249* (2013.01); *B64D 2041/005* (2013.01); *H01M 2250/20* (2013.01); *H01M 2250/405* (2013.01); *Y02B 90/16* (2013.01); *Y02T 90/32* (2013.01); *Y02T 90/36* (2013.01)

(56) References Cited

U.S. PATENT DOCUMENTS

| | | |
|---|---|---|
| 2004/0043276 A1 | 3/2004 | Hoffjann et al. |
| 2004/0057177 A1 | 3/2004 | Glahn et al. |
| 2006/0138278 A1 | 6/2006 | Gans |
| 2007/0172707 A1 | 7/2007 | Hoffjann et al. |
| 2008/0001026 A1 | 1/2008 | Hoffjann et al. |
| 2008/0038597 A1 | 2/2008 | Hoffjann et al. |
| 2008/0133076 A1 | 6/2008 | Formanski et al. |
| 2010/0193629 A1 | 8/2010 | Breit et al. |
| 2010/0221642 A1 | 9/2010 | Frahm et al. |
| 2013/0210329 A1 | 8/2013 | God et al. |
| 2014/0191733 A1* | 7/2014 | Kaanta ............. H01M 8/04955 322/2 R |
| 2015/0028670 A1* | 1/2015 | Boodaghians ......... B64D 11/04 307/9.1 |

FOREIGN PATENT DOCUMENTS

| | | |
|---|---|---|
| DE | 102006042300 B4 | 9/2008 |
| DE | 102007054291 A1 | 4/2009 |
| EP | 2213571 B1 | 8/2010 |
| WO | 2006058774 A2 | 6/2006 |
| WO | 2007/039211 A1 | 4/2007 |
| WO | 2007039211 A1 | 4/2007 |
| WO | 2007057188 A1 | 5/2007 |
| WO | 2011089016 A2 | 7/2011 |

OTHER PUBLICATIONS

International Patent Application No. PCT/IB2014/058297, International Search Report and Written Opinion dated Apr. 9, 2014.
Chinese Patent Application No. 201480010951.5, Office Action (including translation) dated Dec. 2, 2016.
Chinese Patent Application No. 201480010951.5, Office Action (including translation) dated Jul. 21, 2017.
European Patent Application No. 14703914.3, Communication Pursuant to Rules 161(1) and 162 EPC dated Aug. 28, 2015.
European Patent Application No. 14703914.3, Communication Pursuant to Article 94(3) EPC dated Mar. 17, 2017.

* cited by examiner

AIRCRAFT ENERGY MANAGEMENT SYSTEM FOR MULTI FUNCTIONAL FUEL CELLS

CROSS REFERENCE TO RELATED APPLICATIONS

This application is the U.S. national phase entry of International Application No. PCT/IB2014/058297, entitled "AIRCRAFT ENERGY MANAGEMENT SYSTEM FOR MULTI FUNCTIONAL FUEL CELLS," filed Jan. 15, 2014, which application claims the benefit of U.S. Provisional Application No. 61/752,586, entitled "AIRCRAFT ENERGY MANAGEMENT SYSTEM BASED ON MULTI FUNCTIONAL FUEL CELLS," filed Jan. 15, 2013 and U.S. Provisional Application No. 61/753,548, entitled "AIRCRAFT ENERGY MANAGEMENT SYSTEM BASED ON MULTI FUNCTIONAL FUEL CELLS," filed Jan. 17, 2013, the entire disclosures of which are hereby incorporated herein by reference.

BACKGROUND OF THE INVENTION

Vast numbers of people travel every day via aircraft, trains, buses, and other commercial vehicles. Such commercial vehicles are often outfitted with components that are important for passenger comfort and satisfaction. For example, commercial passenger aircraft can have catering equipment, heating/cooling systems, lavatories, water heaters, power seats, passenger entertainment units, lighting systems, and other components. A number of these components on-board an aircraft require electrical power for their activation. Although many of these components are separate from the electrical components that are actually required to run the aircraft (i.e., the navigation system, fuel gauges, flight controls, and hydraulic systems), an ongoing concern with these components is their energy consumption. Frequently, such systems require more power than can be drawn from the aircraft engines' drive generators, necessitating additional power sources, such as a kerosene-burning auxiliary power unit (APU) (or by a ground power unit if the aircraft is not yet in flight). Energy from these power sources may have to travel a significant distance to reach the power-consuming components, resulting in loss of power during transmission and a reduction in overall efficiency of power systems. The total energy consumption can also be rather large, particularly for long flights with hundreds of passengers, and may require significant amounts of fossil fuels for operation. Additionally, use of aircraft power typically produces noise and $CO_2$ emissions, both of which are desirably reduced.

The relatively new technology of fuel cell systems provides a promising cleaner and quieter means to supplement energy sources already aboard commercial crafts. A fuel cell system produces electrical energy as a main product by combining a fuel source of liquid, gaseous, or solid hydrogen with a source of oxygen, such as oxygen in the air, compressed oxygen, or chemical oxygen generation. A fuel cell system has several outputs in addition to electrical power, and these other outputs often are not utilized and therefore become waste. For example, thermal power (heat), water, and oxygen-depleted air (ODA) are produced as by-products. These by-products are far less harmful than CO2 emissions from current aircraft power generation processes.

Furthermore, demand from power-consuming components may vary substantially throughout the duration of a flight. The variation in demand may be difficult to predict. The variation in demand for power may also cause the demand for power to differ significantly from the amount of power that is produced, which can cause further inefficiency and/or otherwise negatively affect operation of power-consuming components. As such, systems that may be implemented to provide greater control over power production and use are desirable for improving effiency and operational life of components aboard the craft.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

As an example embodiment, disclosed is an aircraft resource management system. The aircraft resource management system can include one or more fuel cell clusters, one or more load clusters, and one or more resource management devices. Each fuel cell cluster can include one or more fuel cell systems configured to receive a hydrogen input comprising hydrogen, receive an oxygen input comprising a fluid having an initial oxygen content, and convert the hydrogen input and the oxygen input so as to yield a number of products. The products can include a water product comprising water, a heat product comprising heat, an oxygen-depleted product comprising the fluid having a second oxygen content lower than the initial oxygen content, and an electric product comprising electrical power. Each load cluster can include at least one load configured to utilize at least one product from one or more of the fuel cell cluster(s). The one or more resource management devices can be collectively configured to perform certain operations. The operations can include comparing a demand level of the one or more load clusters with a supply level of the one or more fuel cell clusters. The demand level and the supply level can correspond to a set of at least one of the products of the one or more fuel cell clusters. The operations can also include instructing adjusting or maintaining an operating level of one or more fuel cell systems of the one or more fuel cell clusters based at least in part on the comparison of the demand level with the supply level.

In a further example embodiment, a method is provided for operating an aircraft resource management system. The method can include providing a fuel cell cluster including at least one fuel cell system and providing a load cluster including at least one load configured to utilize at least one product from the fuel cell cluster. The method can also include comparing a demand level of the load cluster with a supply level of the fuel cell cluster. The demand level and the supply level can correspond to a set of at least one of the products of the fuel cell cluster. The method can also include adjusting or maintaining an operating level of the at least one fuel cell system of the fuel cell cluster based at least in part on the comparison of the demand level with the supply level.

For a fuller understanding of the nature and advantages of the present invention, reference should be made to the ensuing detailed description and accompanying drawings.

BRIEF DESCRIPTION OF THE DRAWINGS

The specification makes reference to the following appended figures, in which use of like reference numerals in different figures is intended to illustrate like or analogous components.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Disclosed herein are systems and processes for managing resources (e.g., outputs and/or inputs) associated with fuel cell systems used as a power source aboard aircraft. For example, organizing fuel cell systems and/or loads associated with the fuel cell systems into clusters can facilitate management or optimization of resource production and/or consumption. As an illustrative example, a cluster of fuel cell systems or a subset of the fuel cell systems in the cluster can be selectively operated to produce a level of resources correlating with a level of resources demanded by loads in an aircraft, thereby improving efficiency by reducing an amount of unused produced resources. While such fuel cell technology is discussed herein in relation to use in aircrafts, it is by no means so limited and may be used in buses, trains, spacecraft, or other forms of transportation equipped with fuel cell systems.

Figure 1:
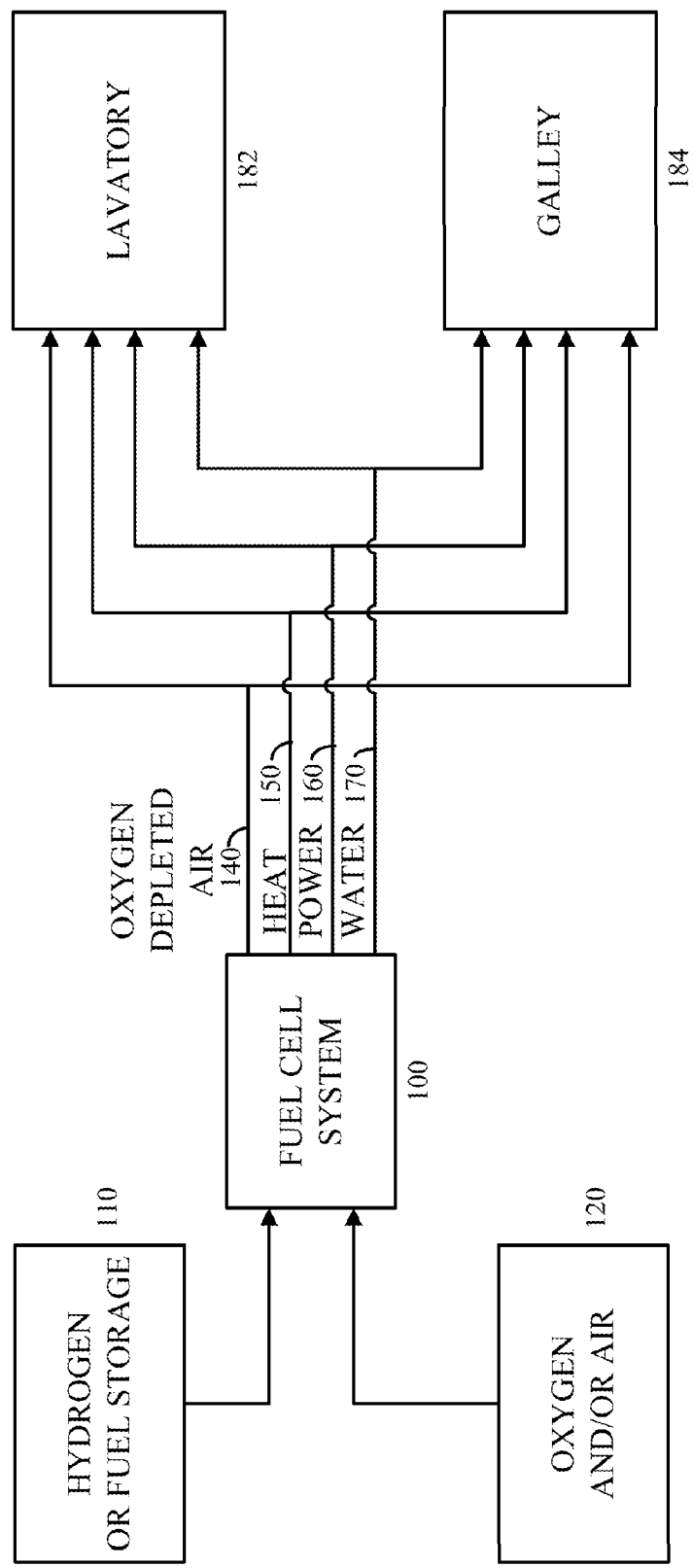
FIG. 1 is a diagram illustrating the inputs and outputs of a fuel cell system and non-limiting examples of how the outputs can be used according to certain embodiments.

A fuel cell system is a device that converts chemical energy from a chemical reaction involving hydrogen or other fuel source and oxygen-rich gas (e.g., air) into electrical energy. As illustrated in FIG. 1, a fuel cell system 100 combines an input of hydrogen or another fuel source 110 with an input of oxygen 120 to generate electrical energy (power) 160. Along with the generated electrical energy 160, the fuel cell system 100 produces water 170, thermal power (heat) 150, and oxygen-depleted air (ODA) 140 as by-products. As further illustrated in FIG. 1, some or all of the fuel cell output products of electrical energy 160, heat 150, water 170, and ODA 140 may be used to operate systems aboard the aircraft, such as, but not limited to, systems of a lavatory 182 or a galley 184 aboard the aircraft. Output products can additionally and/or alternatively be routed to other areas for use where such output products are useful, including, but not limited to, routing to aircraft wings for ice protection, to showers, to passenger cabins, to passenger seats, and/or to fuel tanks. One or more than one output product can be utilized in any given location, and any given output product may be utilized in one or more locations. Exemplary, but non-limiting, examples of aircraft systems utilizing fuel cell output products are disclosed in International Patent Application No. PCT/US13/030638, entitled "FUEL CELL SYSTEM POWERED LAVATORY," filed Mar. 13, 2013 (Applicant's File Reference No. 862890) and International Patent Application No. PCT/IB2013/052004, entitled "POWER MANAGEMENT FOR GALLEY WITH FUEL CELL," filed Mar. 13, 2013 (Applicant's File Reference No. 862904) the entire disclosures of which are hereby incorporated herein by reference.

Any appropriate fuel cell system 100 may be used, including, but not limited to, a Proton Exchange Membrane Fuel Cell (PEMFC), a Solid Oxide Fuel Cell (SOFC), a Molten Carbonate Fuel Cell (MCFC), a Direct Methanol Fuel Cell (DMFC), an Alkaline Fuel Cell (AFC), or a Phosphoric Acid Fuel Cell (PAFC). Any other existing or future fuel cell system technology, including, but not limited to, a hybrid solution, may also be used. Amounts and/or ratios of resource consumption and production can vary according to the size, type, and/or calibration of fuel cell systems 100 utilized, and accordingly, specific examples of resource production or consumption described herein should not be interpreted as limiting the present disclosure.

Various systems for passenger comfort can demand varying amounts of these resources that are associated with fuel cell systems 100. As such, separate passenger comfort systems (or individual components of such systems) can be characterized as loads within the overall infrastructure of the aircraft. For example, in one aspect, an overhead light for a passenger seat may be considered a load demanding electrical power, and in another aspect, a lighting system including all overhead lights for passenger seats may be considered a single load with an overall demand for electrical power. As another example, in one aspect, a handwashing faucet for a lavatory may be a load demanding water and thermal energy, while in another aspect, the lavatory is an individual load with a combined demand for water, thermal energy, ODA, and electrical power that corresponds to the combined demand for operating toilet, faucet, lighting, and sanitation components of the lavatory.

Figure 2:
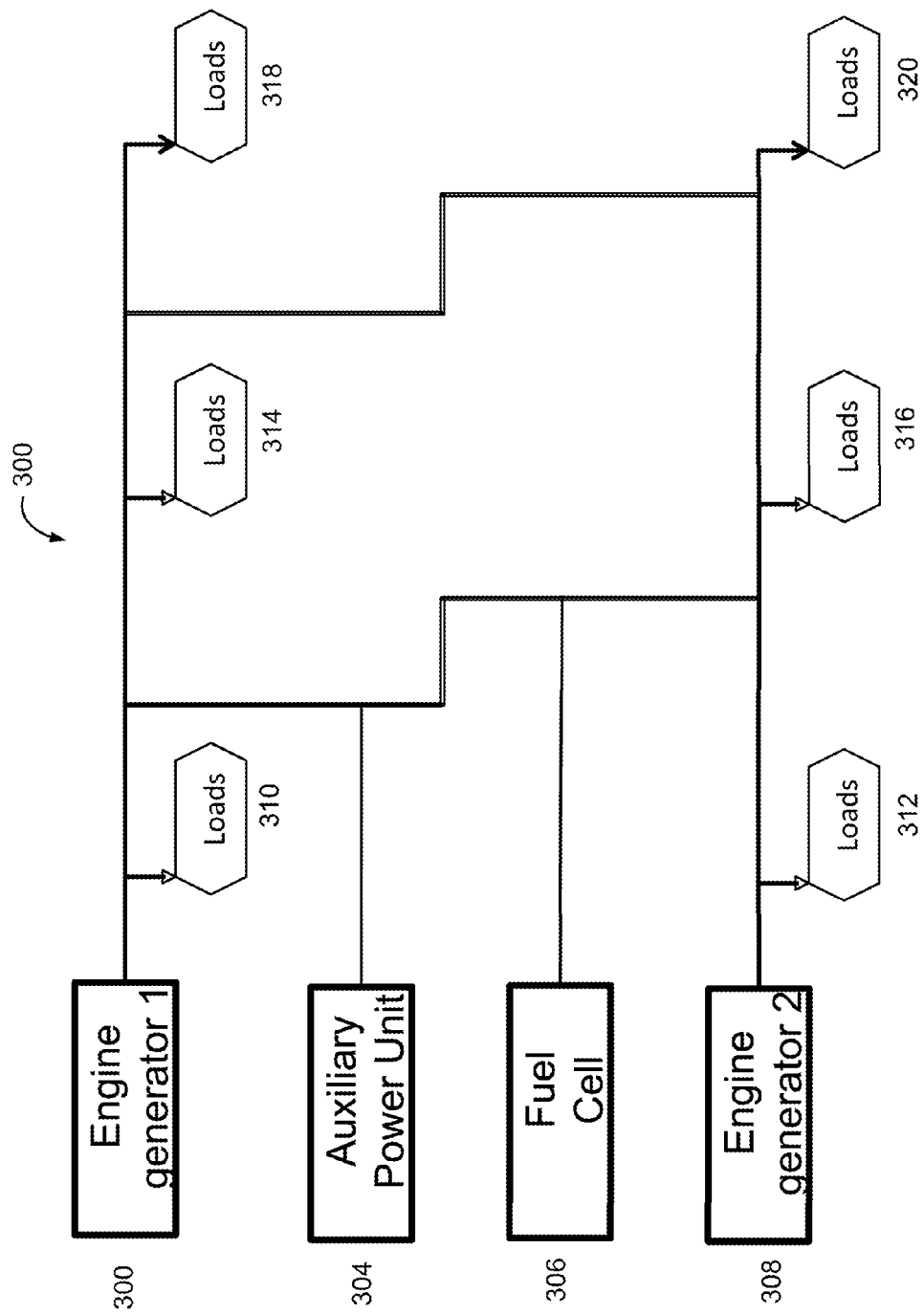
FIG. 2 is a diagram illustrating an example of an electrical power network for an aircraft according to certain embodiments.

In various aspects, fuel cell systems 100 can provide a supply of one or more of the resources demanded by a load. In some aspects, one or more fuel cell systems 100 can be the sole provision of the resource(s) for the load. In other aspects, the fuel cell system(s) 100 may supplement other sources of the resource(s) for the load. For example, FIG. 2 is an example of an electrical power network 300 for an aircraft. The electrical power network 300 can include a number of loads 310, 312, 314, 316, 318, and 320. The loads 310, 312, 314, 316, 318, and 320 can have varying demands for electrical power. Demand may depend on a flight phase of the aircraft. The table below (similar to a table disclosed in International Patent Application No. PCT/IB2013/051979, entitled "VEHICLE SEAT POWERED BY FUEL CELL," filed Mar. 13, 2013, Applicant's File Reference No 864896, the entire disclosure of which is hereby incorporated herein by reference), provides examples of power demand for various components related to a passenger seat:

| Equipment | Power consumption/Passenger | |
| --- | --- | --- |
| | Economy class | Business class |
| IFE (In Flight Entertainment) | 30 W | 50 W |
| Reading light | 12 W | 12 W |
| Actuator | — | 75 W |
| Power supply (lap top, usb device . . .) | 70 W | 75 W |
| Massage | — | 24 W |
| Other equipment | TBD | TBD |
| TOTAL | >100 W | >236 W |

The electrical power network 300 can also include a number of power sources to provide power to the various loads. For example, the electrical power network 300 can include a first engine generator 302, a second engine generator 308, an auxiliary power unit 304, and a fuel cell system 306. The engine generators 302 and 308 can be coupled with engines used to propel the aircraft to produce electrical power when the engines are operating. The auxiliary power unit 304 can include a fuel-burning generator that can produce electrical power independent of the aircraft drive engines. The fuel cell system 306 can include one or more fuel cell systems 100 described above with respect to FIG. 1. While the electrical power network 300 is depicted in FIG. 2 with the components as just described, any number and/or type of loads and/or power sources may be included. In certain embodiments, one or more inverters may be included with one or more power sources to provide alternating current ("AC") power to those applicable loads that utilize AC power.

The power sources 302, 304, 306, and 308 can be incorporated into the electrical power network 300 to provide sufficient power to meet the demand for power in the electrical power network 300 (i.e., the combined demand from the loads 310, 312, 314, 316, 318, and/or 320). In such an arrangement, power from any power source 302, 304, 306, or 308 can be distributed to any load 310, 312, 314, 316, 318, or 320. However, this may also result in power from a particular power source travelling a long distance to reach a particular load demanding the power. The distance can allow the power to dissipate during transmission. For example, a first load 310 located near the first engine generator 302 and a sixth load 320 located far from the first engine generator 302 may have the same demand for power. Although the demands are the same, the first engine generator 302 may have to produce more power to meet the demand for the sixth load 320 than to meet the demand for the first load 310 due to power losses during transmission over the greater distance to the sixth load 320.

In various embodiments, the distance between load(s) and power source(s) can be reduced by configuring loads to primarily or exclusively draw power from power sources near the load. For example, in some aspects, a plurality of fuel cell systems 100 can be positioned throughout the aircraft to provide power sources that are near the points of use for loads. The loads may be grouped into clusters associated with one or more particular power sources-such as fuel cell systems 100—located near the cluster.

Figure 3:
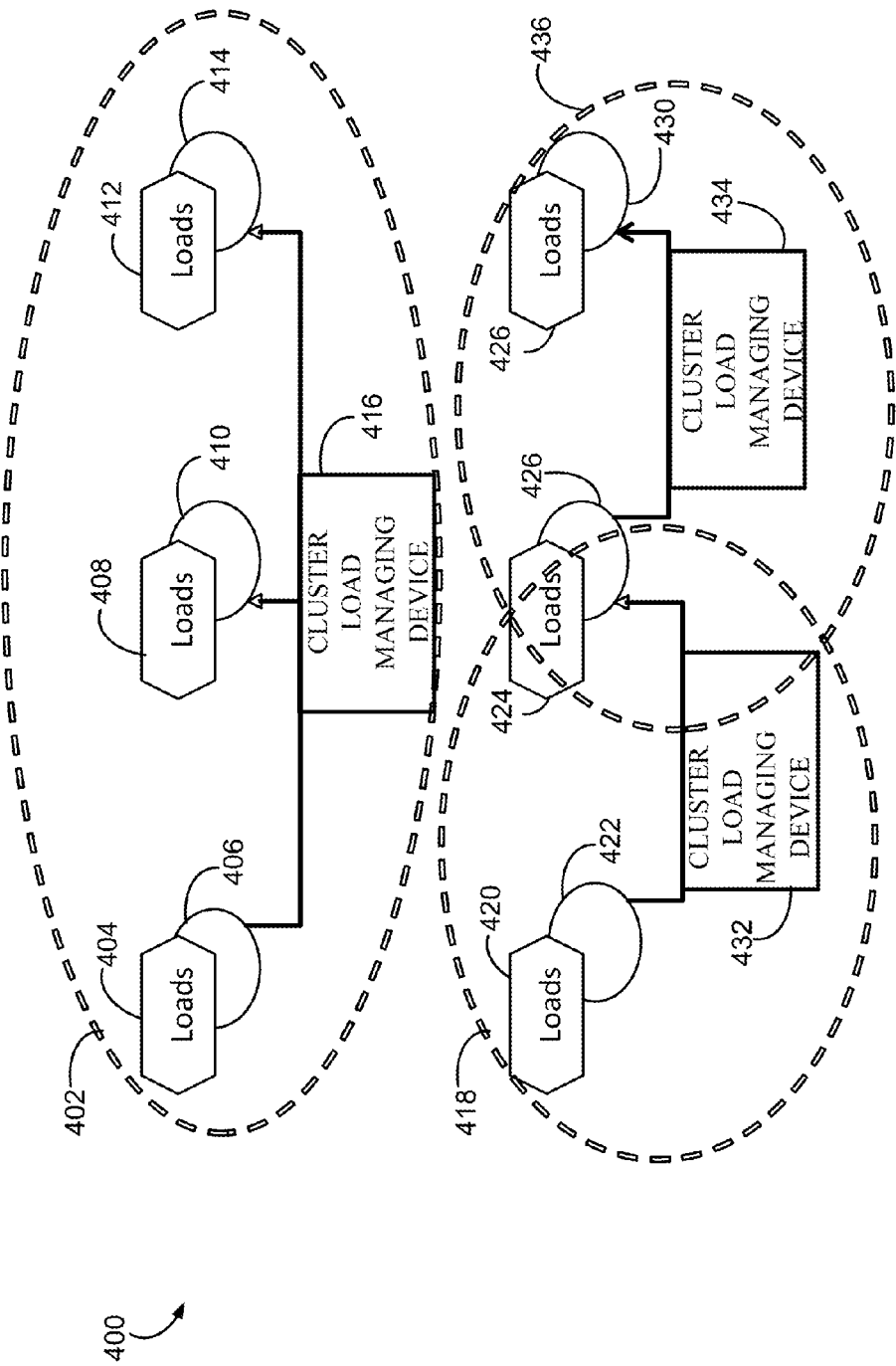
FIG. 3 is a diagram illustrating an example of a power network having load clusters according to certain embodiments.

Other benefits may also be derived from organizing loads into clusters. FIG. 3 is a diagram illustrating an example of a power network 400 having load clusters 402, 418, and 436. The load clusters 402, 418, and 436 can include loads 404, 408, 412, 420, 424, and/or 428, which may be similar to or correspond to the loads 310, 312, 314, 316, 318, and/or 320 described above with respect to FIG. 2. The first load cluster 402 can be associated with a particular power source that can supply a consistent amount of power to the first load cluster 402. The first load cluster 402 is depicted with three loads 404, 408, and 412, but a load cluster generally may alternatively include any number of loads, including one, two, three, or more than three. The first load cluster 402 can also include a cluster load managing device 416. The cluster load managing device 416 can control the way in which the power that is supplied to the first load cluster 402 is distributed between the loads 404, 408, and 412 in the first load cluster 402. In some aspects, the cluster load managing device 416 can optimize a power schedule for the loads 404, 408, and/or 412. For example, each load 404, 408, and 412 can be respectively associated with a load managing device 406, 410, and 414 for communicating a power demand of the respective load 404, 408, or 412 to the cluster load managing device 416. The cluster load managing device 416 can distribute the power available to the first load cluster 402 based on the respective power demands of the loads 404, 408, and 412. The demand may be contemporaneous or prospective. In some aspects, one or more of the respective power demands are based on a pre-determined value, and one or more of the load managing devices 406, 410, 414 are omitted. For example, the cluster load managing device 416 may distribute power based on one or more stored values corresponding to expected demands of the loads 404, 408, and 412 during particular flight phases of the aircraft.

As an illustrative example of components of the first load cluster 402 in operation, the first load cluster 402 may be allocated a consistent supply of 100 W of power, such as from a fuel cell system 100 located nearby. The first load managing device 406 may communicate a power demand of 30 W for the first load 404 (for example, an in-flight entertainment device playing a movie for a passenger), the second load managing device 410 may communicate a power demand of 70 W for the second load 408 (for example, a power supply charging a passenger's laptop), and the third load managing device 414 may communicate a power demand of 0 W for the third load 412 (such as a reading light that is not in use while the in-flight entertainment device is in use but might otherwise demand 12 W if activated). Based on the communicated power demands, the cluster load managing device 416 can distribute 30 W to the first load 404, 70 W to the second load 408, and 0 W to the third load 412. Preventing power communication to the third load 412 when it does not have a demand for power can reduce the amount of power usage of the first load cluster 402.

The power network 400 may also include overlapping load clusters 418 and 436. Similar to the first load cluster 402, the second load cluster 418 and the third load cluster 436 may also each have access to consistent amounts of power. Each can also respectively include cluster load managing devices 432 and 434 similar to the cluster load managing device 416. The loads 420, 424, and 428 of the second load cluster 418 and the third load cluster 436 can be respectively associated with load managing devices 422, 426, and 430 similar to the load managing devices 406, 410, and 414. The second load cluster 418 and the third load cluster 436 may share one or more loads in common, such as the fifth load 424 in the power network 400.

Sharing one or more loads 424 can allow power sharing between the overlapping load clusters 418 and 436 in the power network 400. In an illustrative example, the second load cluster 418 and the third load cluster 436 each have 100 W readily available from associated power supplies, and the power demands are 50 W for the fourth load 420, 80 W for the fifth load 424, and 70 W for the sixth load 428. Accordingly, the second load cluster 418 has a total power demand of 130 W, and the third load cluster 436 has a total power demand of 150 W. In such a situation, neither load cluster 418 or 436 individually has access to sufficient power to meet the power demands of the respective load cluster 418 or 436. However, due to the shared fifth load 424, the total power available to the overlapping load clusters 418 and 436 can meet the demand. Each load cluster 418 and 436 can first dedicate power to the respective load 420 or 428 that is only part of the respective load cluster 418 or 436. With the remaining unapportioned power, the shared fifth load 424 can receive 50 W from the second load cluster 418 and 30 W from the third load cluster 436, thereby satisfying the total 80 W demanded by the shared fifth load 424. By sharing power between overlapping load clusters 418 and 436, the power network 400 can provide power management that avoids peak of power demand or supply that can damage components or reduce efficiency of the power network 400.

Figure 4:
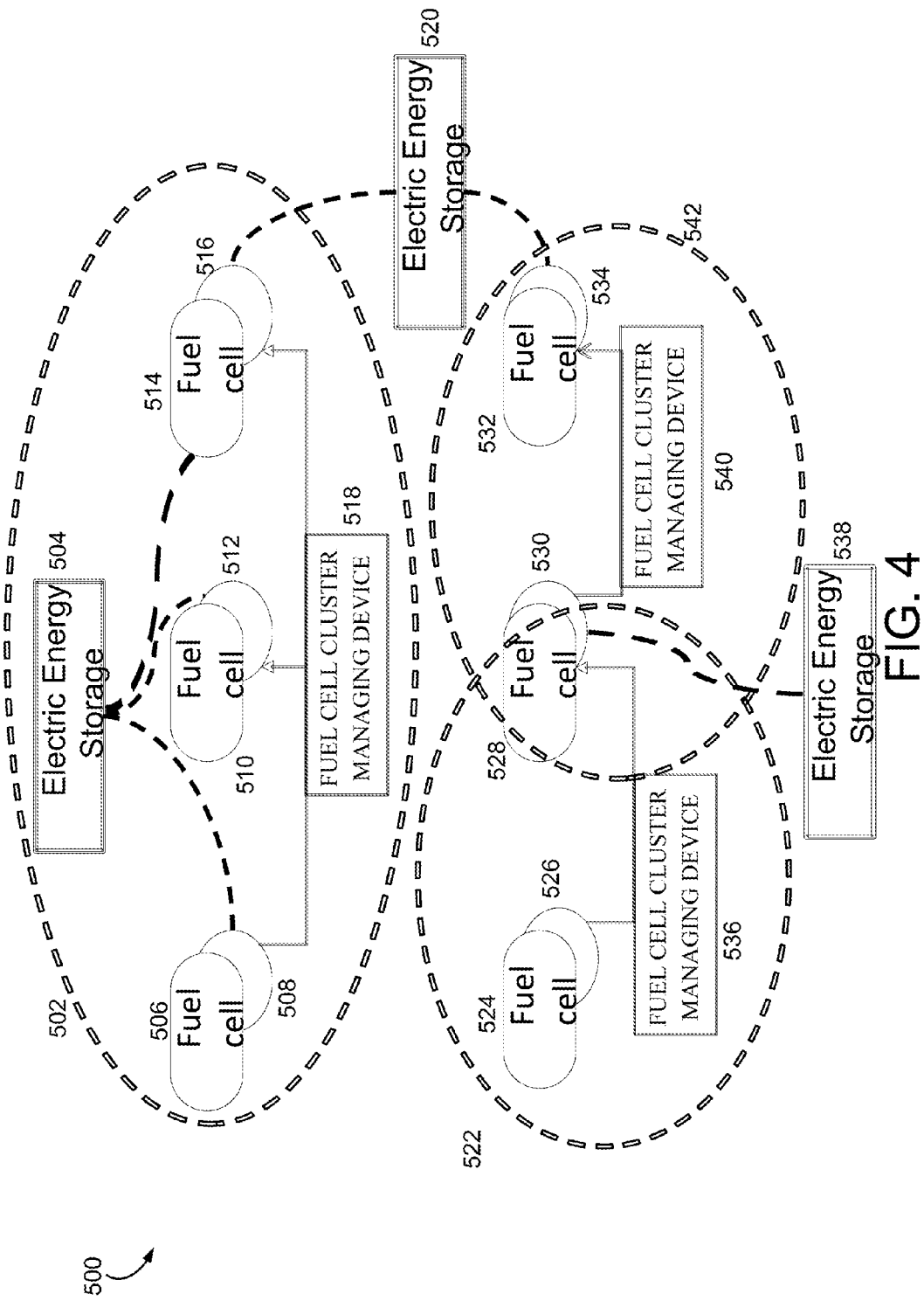
FIG. 4 is a diagram illustrating an example of a power network having fuel cell clusters according to certain embodiments.

In some aspects, power sources—such as fuel cell systems 100—can also be organized into clusters. For example, FIG. 4 is a diagram illustrating an example of a power network 500 having fuel cell clusters 502, 522, and 542. Each fuel cell cluster 502, 522, and 542 can be used to power one or more load clusters, such as load clusters 402, 418, or 436 described above with respect to FIG. 3. The first fuel cell cluster 502 is depicted with three fuel cell systems 506, 510, and 514 but a fuel cell cluster generally may alternatively include any number of fuel cell systems, including one, two, three, or more than three. Any fuel cell cluster 502, 522, or 542 can also include a respective fuel cell cluster managing device 518, 536, and 540. In some aspects, multiple fuel cell clusters may share a single fuel cell cluster managing device. A fuel cell cluster managing device can control the way in which associated fuel cell systems are operated. For example, the fuel cell cluster managing device 518 can individually activate or deactivate the fuel cell systems 506, 510, or 514 in fuel cell cluster 502. In some aspects, the fuel cell cluster managing device 518 can be in communication (such as via wireless or wired arrangements) with the balance of plant 508, 512, and 516 respectively associated with each of the fuel cell systems 506, 510, and 514. The balance of plant 508, 512, and 516 can include components (such as blowers, compressors, and pumps) that determine the rates at which resources are consumed and produced by the each fuel cell system 506, 510, and 514. In some aspects, the fuel cell cluster managing device 518 can receive information regarding an operating level of the fuel cell system 506, 510, or 514 from the balance of plant 508, 512, or 516. In some aspects, the fuel cell cluster managing device 518 can control the balance of plant 508, 512, or 516 to increase or decrease the operating level of the fuel cell system 506, 510, or 514.

Including multiple fuel cell systems in a fuel cell cluster may provide redundancy in case of a failure of one or more of the fuel cell systems. As an illustrative example, the first fuel cell cluster 502 may be powering a load cluster with normal power demands ranging up to 1 KW. Each fuel cell system 506, 510, and/or 514 may be capable of providing 1 KW at full operational capacity. The fuel cell cluster managing device 518 may control each balance of plant 508, 512, and 516 so that each fuel cell system 506, 510, and 514 produces approximately 0.33 KW, thereby producing a combined total of 1.0 KW to meet the demand. If the first fuel cell system 506 fails, the fuel cell cluster managing device 518 may control the second fuel cell system 510 and the third fuel cell system 514 so that each produces 0.5 KW, thereby still producing the combined total of 1.0 KW to meet the demand. Because many fuel cell systems operate at greater efficiency when operating at consistent and lower power levels, utilizing multiple fuel cell systems in a fuel cell cluster to reduce power levels generated by each fuel cell system may also increase overall efficiency in meeting a combined larger power demand.

The power network 500 can include electric storage devices, such as electric energy storage devices 504, 520, and 538. Non-limiting examples of electric energy storage devices include batteries, capacitors, super-capacitors, and combinations thereof. Individual electric storage devices may be associated with individual fuel cell systems (such as electric energy storage device 538 associated solely with fuel cell system 528), with multiple fuel cell systems (such as electric energy storage device 504 associated with fuel cell systems 506, 510, and 514), with individual fuel cell clusters (such as electric energy storage device 504 associated only with fuel cell cluster 502), or with multiple fuel cell clusters (such as electric energy storage device 520 associated with both fuel cell clusters 502 and 542). Individual fuel cell systems can also be associated with any number of electric energy storage devices, including zero (such as fuel cell system 524), one (such as fuel cell system 506 associated solely with electric energy storage device 504), or more than one (such as fuel cell system 514 associated with both electric energy storage device 504 and electric energy storage device 520).

Power generated by one or more fuel cell systems can be stored in one or more electric energy storage devices. As an illustrative example, the first fuel cell cluster 502 may be powering a load cluster with normal power demands ranging up to 1 KW. Each fuel cell system 506, 510, and/or 514 may be capable of providing 1 KW at full operational capacity. The fuel cell cluster managing device 518 may control each balance of plant 508, 512, and 516 so that each fuel cell system 506, 510, and 514 produce 0.4 KW (i.e., a total of 1.2 KW). The surplus 0.2 KW generated when the load demand reaches its maximum of 1 KW can be stored in the electric energy storage device 504 and/or in the electric energy storage device 520. The stored power can be utilized for various applications, including, but not limited to, situations where the demand exceeds the normal 1 KW range, situations where any of the fuel cell systems 506, 510, and/or 514 fail, or as an additional source of power for other load clusters.

Overlapping fuel cell clusters 522 and 542 can share a common fuel cell system 528. Including a common fuel cell system 528 in both fuel cell clusters 522 and 542 can allow either fuel cell cluster 522 or 542 to selectively utilize the common fuel cell system 528, such as for redundancy or efficiency purposes. In an illustrative example, the fourth fuel cell system 524, the fifth fuel cell system 528, and the sixth fuel cell system 532 can each provide up to 1 KW of power and is each most efficient when producing 0.4 KW. If the second fuel cell cluster 522 experiences a demand of 0.6 KW, the second fuel cell cluster managing device 536 can control the balance of plant 526 to cause the fourth fuel cell system 524 to produce 0.4 KW (thereby operating the fourth fuel cell system 524 at greatest efficiency) and control the balance of plant 530 to cause the fifth fuel cell system 528 to produce the remaining 0.2 KW. If the third fuel cell cluster 542 then experiences a demand of 0.7 KW, the third fuel cell cluster managing device 540 can control the balance of plant 534 to cause the sixth fuel cell system 532 to produce 0.4 KW (thereby operating the sixth fuel cell system 532 at greatest efficiency also) and control the balance of plant 530 to cause the fifth fuel cell system 528 to produce an additional 0.3 KW (i.e., a total production of 0.5 KW to meet the combined demands of both the second fuel cell cluster 522 and the third fuel cell cluster 542). In some aspects, the second fuel cell cluster managing device 536 and the third fuel cell cluster managing device 540 can be in communication (such as via wireless or wired arrangements) with one another and may operate the fourth, fifth, and sixth fuel cell systems 524, 528, and 532 so as to maximize overall efficiency. Although each fuel cell system 524, 528, and 532 is described in the preceding illustrative example as providing up to the same amount of power, fuel cell systems disclosed herein may have differing maximum power outputs. For example, in an alternative arrangement of the preceding illustrative example, the fourth fuel cell system 524 could have a maximum capacity of 4 KW, the fifth fuel cell system 528 could have a maximum capacity of 16 KW, and the sixth fuel cell system 532 could have a maximum capacity of 8 KW.

Figure 5:
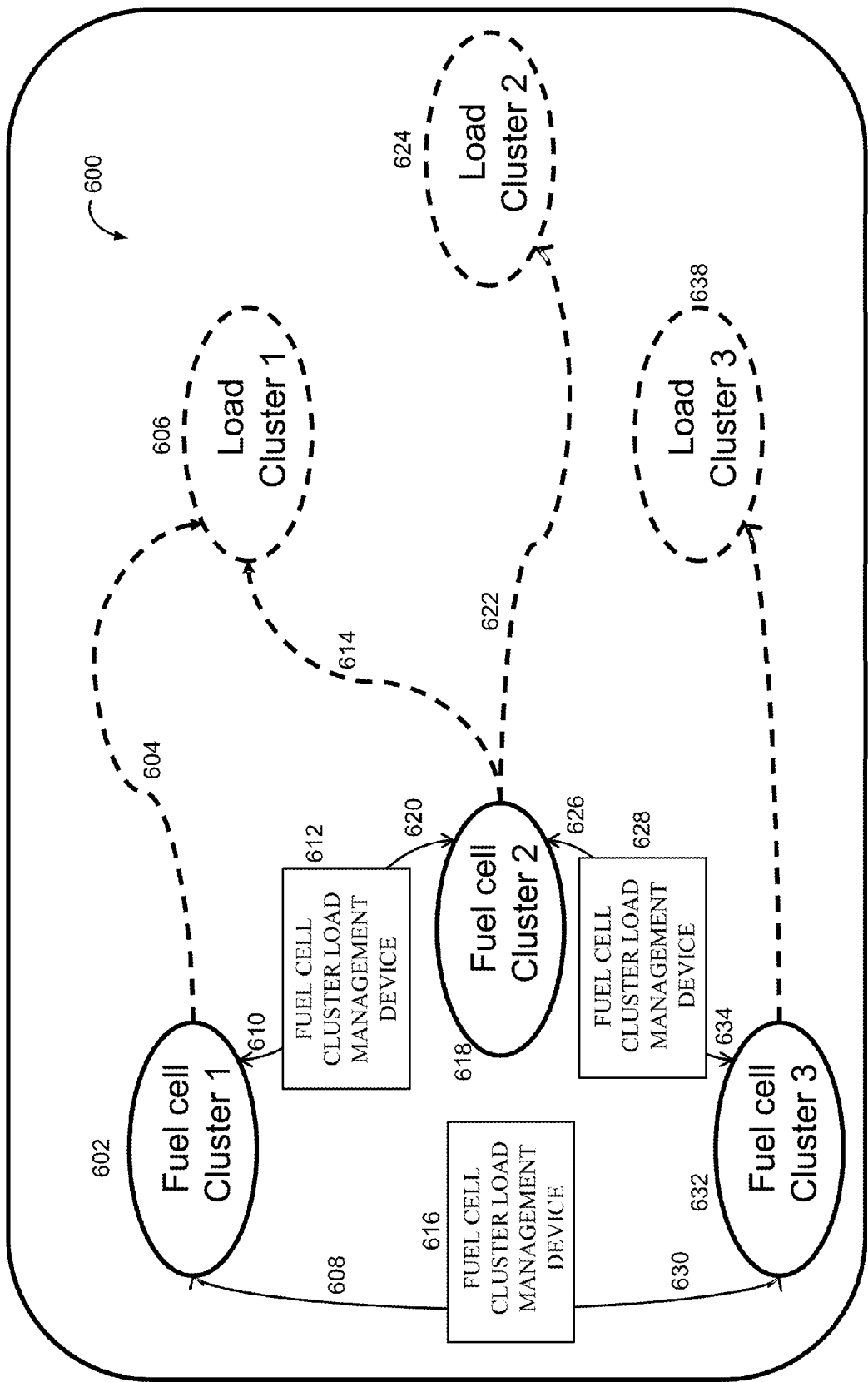
FIG. 5 is a diagram illustrating an example of a global energy management system according to certain embodiments.

FIG. 5 is a diagram illustrating an example of a global energy management system 600. The global energy management system 600 can include fuel cell clusters 602, 618, and 632 connected to load clusters 606, 624, and 638 via power lines 604, 614, 622, and 636. The fuel cell clusters 602, 618, and 632 may be similar to the fuel cell clusters 502, 522, and 542 depicted in FIG. 4, and the load clusters 606, 624, and 638 may be similar to the load clusters 402, 418, and 436 depicted in FIG. 3. The global energy management system 600 can also include fuel cell cluster load management devices 612, 616, and 628. The fuel cell cluster load management devices 612, 616, and 628 can manage power and load distribution between the fuel cell clusters 602, 618, and 632 and the load clusters 606, 624, and 638. For example, the first fuel cell cluster load management device 612 can be connected between first and second fuel cell clusters 602 and 618 via power and/or communication lines 610 and 620. The first fuel cell cluster load management device 612 can determine the load demand on the first and second fuel cell clusters 602 and 618 and distribute power from the first and second fuel cell clusters 602 and 618 accordingly. In a similar fashion, the second fuel cell cluster load management device 628 can be connected between the second and third fuel cell clusters 618 and 632 via power and/or communication lines 626 and 634 to determine load demand and manage power distribution. Likewise, the third fuel cell cluster load management device 616 can be connected between the first and third fuel cell clusters 602 and 632 via power and/or communication lines 608 and 630 to determine load demand and manage power distribution. The fuel cell cluster load management devices 612, 616, and 628 may communicate between one another, such as by wireless communication arrangements or in a cycle along lines 610, 620, 626, 634, 630, and 638. In some aspects, the fuel cell cluster load management devices 612, 616, and 628 can control the fuel cell clusters 602, 618, and 632 to adjust an amount of power produced. While multiple fuel cell cluster load management devices 612, 616, and 628 are depicted in FIG. 5, in some aspects, a single fuel cell cluster load management device can control the whole global energy management system 600.

The global energy management system 600 can be arranged so that power from any fuel cell cluster 602, 618, 632 can be directed to any load cluster 606, 624, or 638. With such a configuration, if the second fuel cell cluster 618 and the third fuel cell cluster 632 were to fail, power from the first fuel cell cluster 602 could be directed to the first load cluster 606 via the power line 604, to the second load cluster 624 via lines 610, 620, and 622, and to the third load cluster 638 via the lines 610, 620, 626, 634, and 636. In some aspects, a component of the global energy management system 600, such as the fuel cell cluster load management device 612, may activate and/or control additional power sources (such as the APU 304 and/or engine generators 302, 308 described above with respect to FIG. 2) to supplement power production from fuel cell clusters, such as when power production from fuel cell clusters 602, 618, 632 is inadequate to fully serve or meet the demand from the various load clusters 606, 624, or 638 in the aircraft.

In some situations, such as if one or more of the fuel cell clusters 602, 618, or 632 were to fail, the demand for power in the system 600 may exceed the supply of power. In such situations, one or more of the fuel cell cluster load management devices 612, 616, or 628 may prioritize the power distribution among the load clusters. In some aspects, the loads may be prioritized based on a flight phase, such as ground, take-off, cruising, or landing. As an illustrative example, we may assume a scenario in which the second fuel cell cluster 618 and the third fuel cell cluster 632 have failed, the first fuel cell cluster 602 can produce 1 KW, and each load cluster 606, 624, 638 has a demand of 1 KW. With the total load demand (3 KW) exceeding the total power supply (1 KW), the fuel cell cluster load management device 612 determines which load cluster 606, 624, 638 will receive power first and in what amount. For example, in a ground flight phase, passengers may desire beverages while not yet being ready for a meal. Accordingly, a load cluster associated with a water heater and/or dispenser may receive a higher priority than a load cluster associated with an oven for warming food. This prioritization and distribution may occur in the background without intervention by the crew. For example, one or more resource management devices (examples of resource management devices are described with respect to the discussion of FIG. 9 below) may automatically manage and adjust the priorities as a function of demand variations corresponding to various flight phases of the aircraft. In some additional or alternative aspects, an interface can be provided to allow crew to adjust and/or view distribution priorities.

Figure 6:
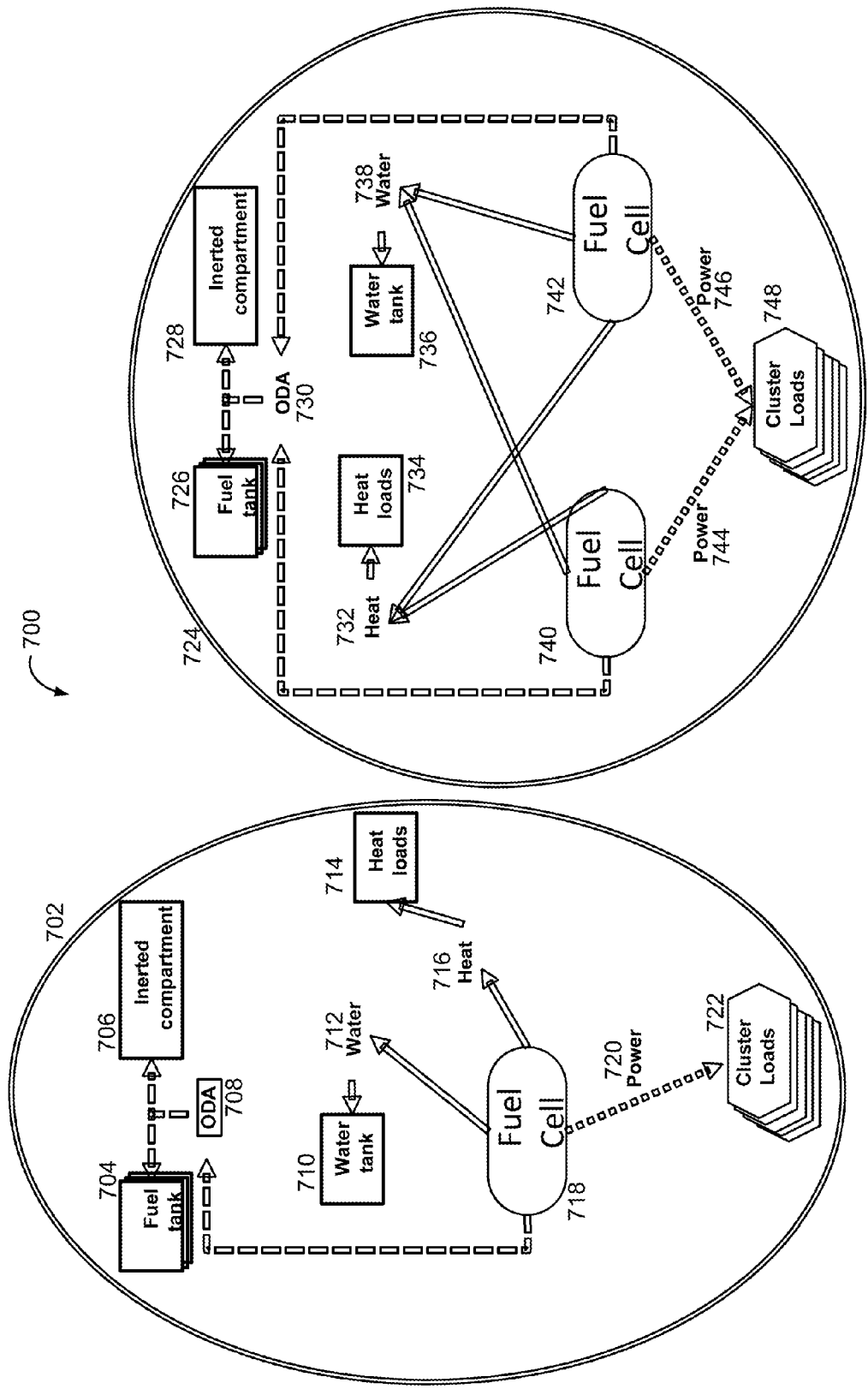
FIG. 6 is a diagram illustrating another example of a global resource management system according to certain embodiments.

FIG. 6 is a diagram illustrating another example of a global resource management system 700. In some aspects, fuel cell clusters can be managed for other resources in addition to power. For example, ODA 708, water 712, heat 716, and power 720 produced by a fuel cell system 718 in a first fuel cell cluster 702 may be used to satisfy a variety of loads in the aircraft. As described above with respect to FIGS. 2-5, the generated electrical power 720 can be utilized to meet demand from various cluster loads 722. The ODA 708 can be directed to a fuel tank 704 for reducing risks of combustion therein and/or to an inerted compartment 706 for sanitation purposes. The water 712 can be routed to the water tank 710 for subsequent use in galleys, lavatories, etc. In some aspects, the water can be mineralized and/or purified prior to subsequent use. Exemplary, but non-limiting, examples of aircraft systems for purifying fuel cell products are disclosed in International Patent Application No. PCT/

US2013/048188, entitled "MICROBIOLOGICALLY PROTECTED FUEL CELL," filed Jun. 27, 2013 (Applicant's File Reference No. 875244), the entire disclosure of which is hereby incorporated herein by reference. The heat 716 can be directed to one or more heat loads. Non-limiting examples of heat loads 714 include drink-heating apparatuses, shower-water-heating apparatuses, handwashing-water-heating apparatuses, ovens, absorption coolers, seat warmers, and wing de-icing. Operation of the first fuel cell cluster 702 can be increased to produce any of these resources to meet demands for any of these resources or decreased to reduce production of these resources to meet limits for any of these resources. For example, the first fuel cell cluster 702 may be operated to meet a demand for water 712 for a hot drink dispenser or terminated to prevent an overflow of the water tank 710.

In some aspects, a fuel cell cluster may pool resources from multiple fuel cell systems. For example, water 738 from both a first fuel cell system 740 and a second fuel cell system 742 of a second fuel cell cluster 724 can be directed to a water tank 736 (which may be different from or the same as water tank 710). Heat loads 734 may utilize heat 732 from both fuel cell systems 740 and 742. Combined ODA 730 may be distributed to a fuel tank 726 and/or inerted compartments 728. Power 744 from the first fuel cell system 740 and power 746 from the second fuel cell system 742 can be provided to cluster loads 748.

Figure 7:
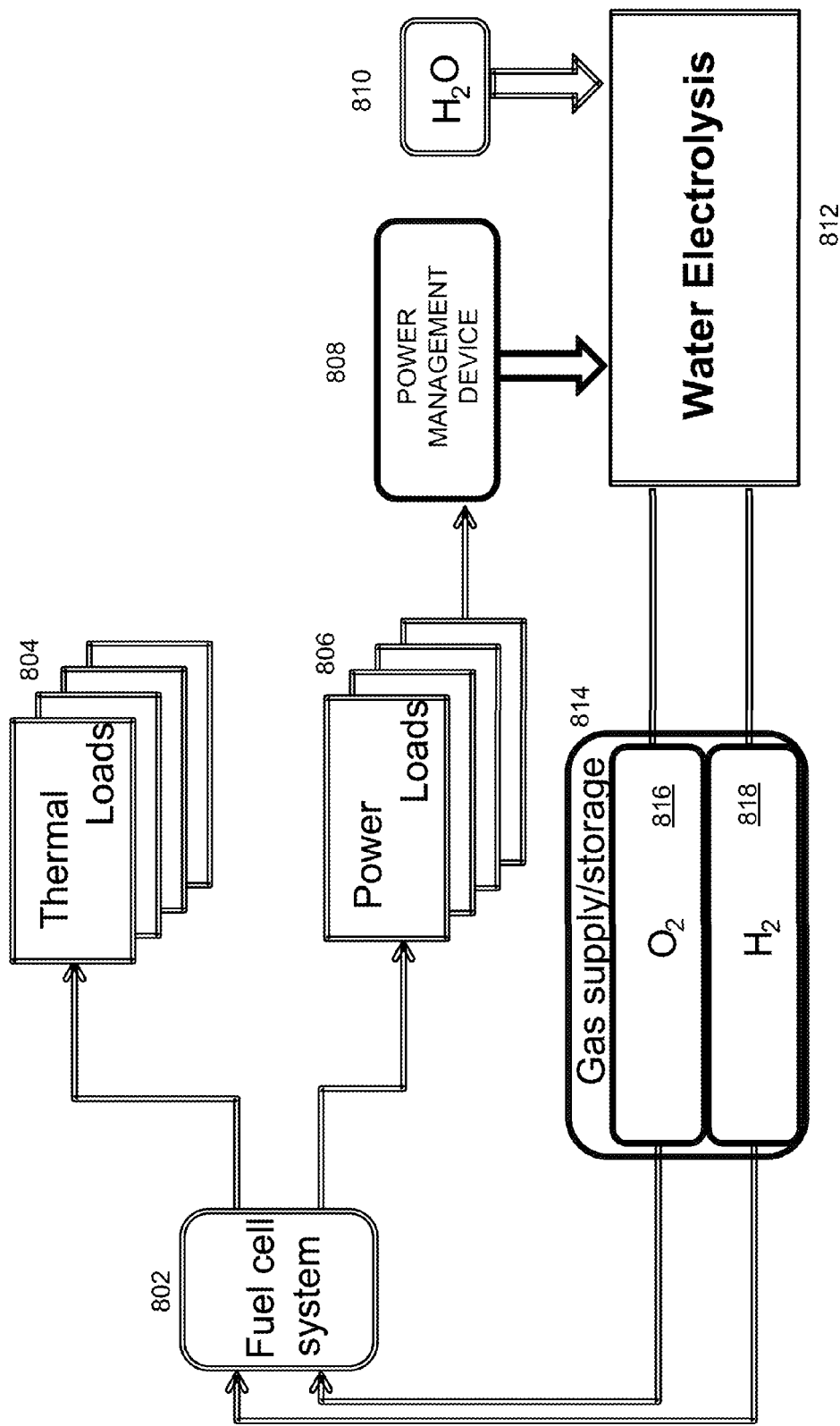
FIG. 7 is a diagram illustrating use of excess power for water electrolysis according to certain embodiments.

In some aspects, when a fuel cell cluster is operated primarily to obtain a resource other than power, excess power may be produced. As illustrated in FIG. 7, excess power may be utilized for water electrolysis. For example, a fuel cell system 802 may be operated to produce heat to meet a demand from thermal loads 804. The power produced by the fuel cell system 802 can be used to meet the demand from power loads 806. If the power produced exceeds the demand from the power loads 806, a power management device 808 can divert some or all of the excess power to a water electrolysis device 812. The water electrolysis device 812 can use the excess power provided by the power management device 808 with a source of water 810 to split the water 810 into oxygen 816 and hydrogen 818, which may be stored in a gas storage 814 for subsequent use in the fuel cell system 802. Such an arrangement can reduce the quantity of hydrogen 818 to be carried aboard the aircraft.

Figure 8:
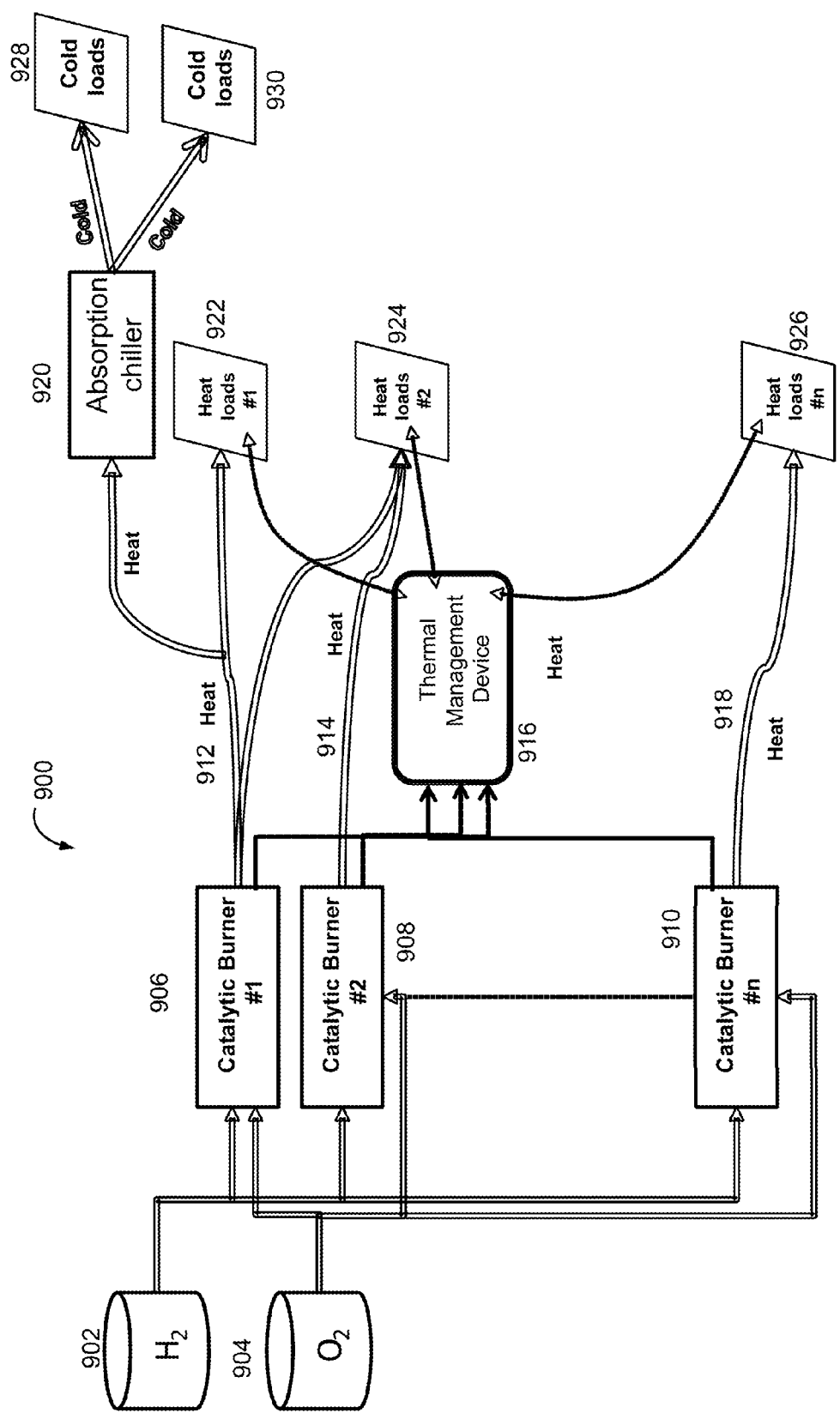
FIG. 8 is a diagram illustrating a thermal network with catalytic burners according to certain embodiments.

In some aspects, catalytic burners can be used as a supplement or as a substitution to meeting demand from heat loads with heat from fuel cell systems. FIG. 8 illustrates a thermal network 900 with catalytic burners 906, 908, 910. Catalytic burners 906, 908, 910 can combine hydrogen 902 and oxygen 904 in a combustion reaction to produce heat. In some aspects, a catalytic burner can produce a greater amount of heat than is produced by consuming an equivalent amount of hydrogen in a fuel cell system. Catalytic burners can be included in fuel cell clusters or provided independently. Catalytic burners may be located close to the heat load to reduce the amount of heat lost during transmission to the load. A thermal management device 916 can be included in the thermal network 900. The thermal management device 916 can be in communication (such as via wireless or wired arrangements) with heat loads 922, 924, and 926. The thermal management device 916 can determine a demand for heat from the heat loads 922, 924, and 926. The thermal management device 916 can be coupled with the catalytic burners 906, 908, and 910 so as to distribute heat 912, 914, and 918 from the respective catalytic burners 906, 908, and 910 to the heat loads 922, 924, and 926. In some aspects, the thermal management device 916 can control operation of the catalytic burners 906, 908, and 910 to adjust an amount of heat produced. Heat may also be distributed to an absorption chiller 920. The absorption chiller 920 may utilize heat to provide chilling to cold loads 928 and 930 that demand cold instead of heat.

In some aspects, the thermal management device 916 is also coupled with one or more fuel cell clusters. The thermal management device 916 may make a determination of whether to use a catalytic burner or a fuel cell system to generate heat based on demand levels from loads other than heat loads. For example, if power produced by a fuel cell is already being diverted to electrolysis, the thermal management device 916 may activate a catalytic burner rather than another fuel cell to meet a demand for additional heat from a heat load.

Figure 9:
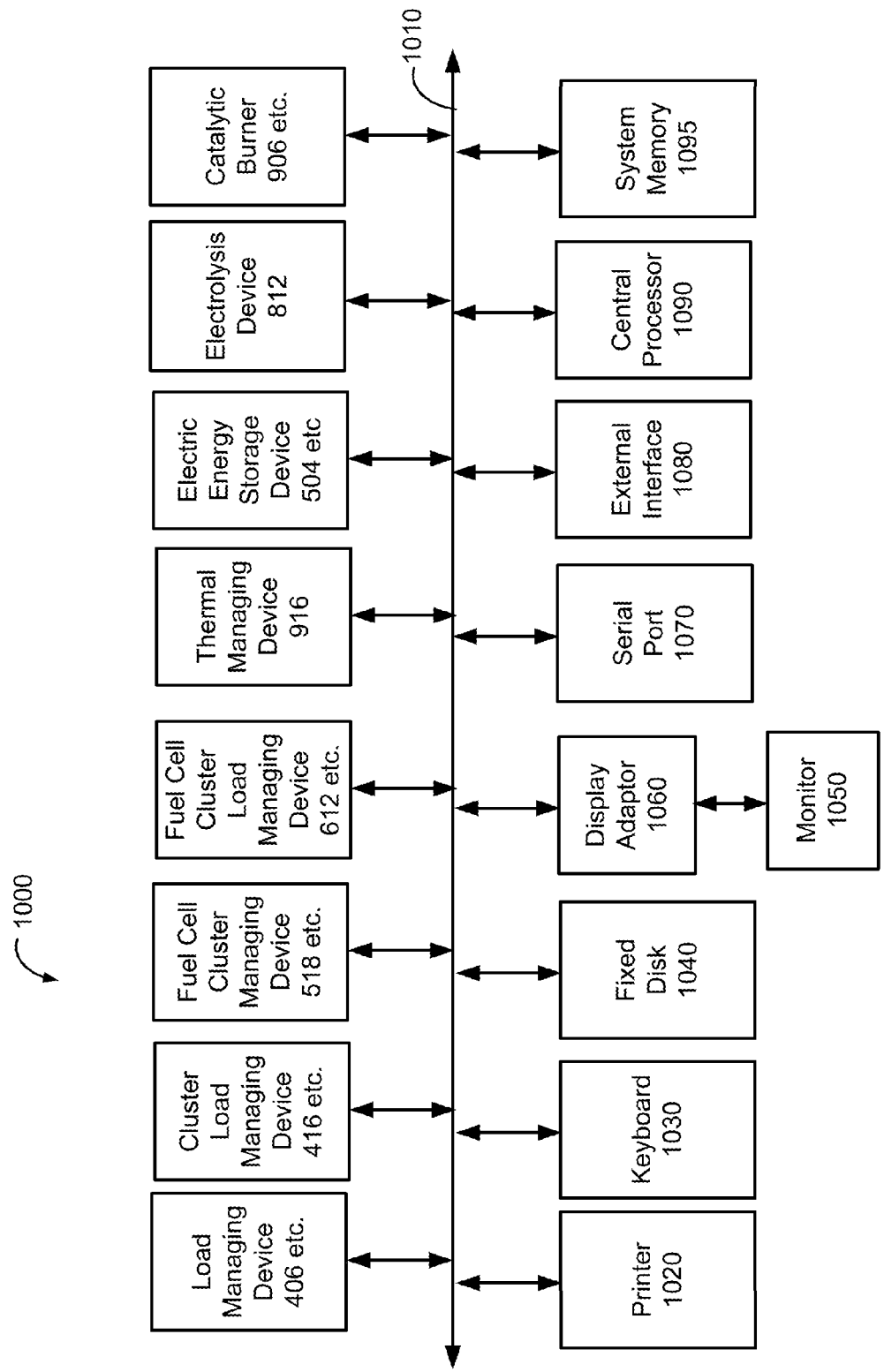
FIG. 9 is a diagram of a computer apparatus, according to certain embodiments.

In embodiments, any of the entities described herein may be embodied in part or in whole by a computer that performs any or all of the functions and operations disclosed. FIG. 9 is a diagram of a computer apparatus 1000, according to certain exemplary embodiments. The various participants and elements in the previously described figures, including resource management devices, may use any suitable number of computer apparatuses 1000 and/or any suitable number of subsystems or components in the computer apparatus 1000 to facilitate the functions described herein. Particular examples of resource management devices include load managing devices 406, 410, 414, 422, 426, and 430 in FIG. 3; cluster load managing devices 416, 432, and 434 in FIG. 3; fuel cell cluster managing devices 518, 536, and 540 in FIG. 4, fuel cell cluster load management devices 612, 616, or 628 in FIG. 5, the thermal management device 916 in FIG. 8, or combinations thereof. Some examples of subsystems or components in the computer apparatus 1000 are shown in the previously described figures. The subsystems or components disclosed herein may be interconnected via the system bus 1010 or other suitable connection, including wireless connections. In addition to the subsystems described above, additional subsystems such as a printer 1020, keyboard 1030, fixed disk 1040 (or other memory comprising computer-readable media), monitor 1050, which is coupled to a display adaptor 1060, and others are shown. Peripherals and input/output (I/O) devices (not shown) can be connected to the computer apparatus 1000 by any number of means known in the art, such as a serial port 1070. For example, the serial port 1070 or an external interface 1080 may be used to connect the computer apparatus 1000 to a wide area network such as the Internet, a mouse input device, or a scanner. The interconnection via the system bus 1010 allows a central processor 1090 to communicate with each subsystem and to control the execution of instructions from a system memory 1095 or the fixed disk 1040, as well as the exchange of information between subsystems. The system memory 1095 and/or the fixed disk 1040 may embody a non-transitory computer-readable medium.

The software components or functions described in this application may be implemented via programming logic controllers ("PLCs"), which may use any suitable PLC programming language. In other embodiments, the software components or functions described in this application may be implemented as software code to be executed by one or more processors using any suitable computer language such as, for example, Java, C++ or Perl using, for example, conventional or object-oriented techniques. The software code may be stored as a series of instructions or commands on a computer-readable medium, such as a random access memory ("RAM"), a read-only memory ("ROM"), a magnetic medium such as a hard-drive or a floppy disk, an optical medium such as a CD-ROM, or a DNA medium. Any such computer-readable medium may also reside on or within a single computational apparatus, and may be present on or within different computational apparatuses within a system or network.

Aspects of the invention can be implemented in the form of control logic in hardware (circuitry, dedicated logic, etc.), software (such as is run on a general purpose computing system or a dedicated machine), firmware (embedded software), or any combination thereof. The control logic may be stored in an information storage medium as a plurality of instructions adapted to direct one information processing device or more than one information processing devices to perform a set of operations disclosed in embodiments of the invention. Based on the disclosure and teachings provided herein, a person of ordinary skill in the art will appreciate other ways and/or methods to implement the invention.

Figure 10:
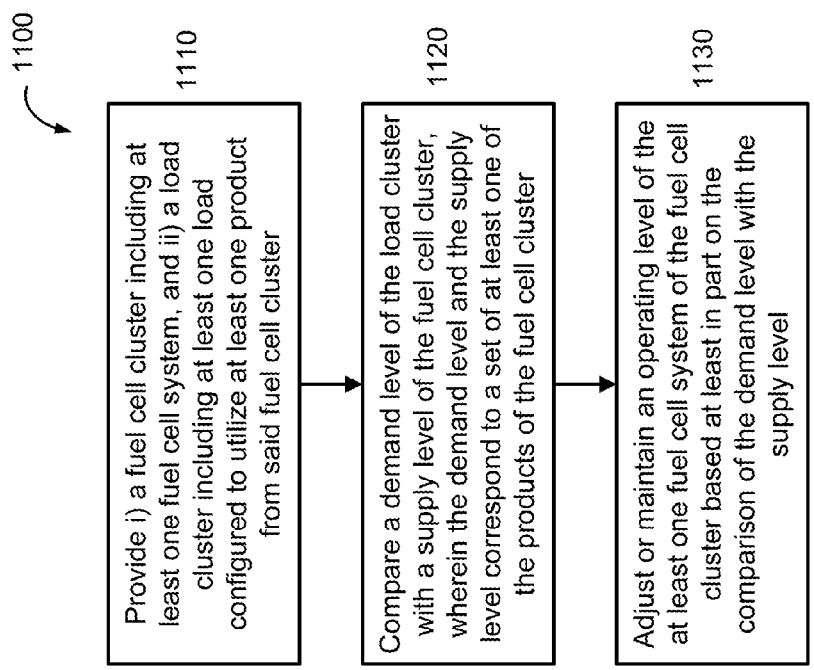
FIG. 10 is a simplified flow diagram illustrating a method for managing resources aboard an aircraft according to certain embodiments.

According to certain embodiments, the operation of one or more systems described herein is illustrated in a simplified flow diagram shown in FIG. 10. FIG. 10 illustrates a method 1100 for managing resources aboard an aircraft according to certain embodiments At operation 1110, the method can include providing a fuel cell cluster including at least one fuel cell system and providing a load cluster including at least one load configured to utilize at least one product from said fuel cell cluster. At operation 1120, the method can include comparing a demand level of the load cluster with a supply level of the fuel cell cluster, wherein the demand level and the supply level correspond to a set of at least one of the products of the fuel cell cluster. At operation 1130, the method can include adjusting or maintaining an operating level of the at least one fuel cell system of the fuel cell cluster based at least in part on the comparison of the demand level with the supply level.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An aircraft resource management system comprising:
(A) a first fuel cell cluster and a second fuel cell cluster, each comprising at least one fuel cell system configured to:
  (i) receive a hydrogen input comprising hydrogen,
  (ii) receive an oxygen input comprising a fluid having an initial oxygen content,
  (iii) convert the hydrogen input and the oxygen input so as to yield products including:
    (a) a water product comprising water,
    (b) a thermal product comprising thermal energy,
    (c) an oxygen-depleted product comprising the fluid having a second oxygen content lower than the initial oxygen content, and
    (d) an electric product comprising electrical power;
(B) at least one load cluster comprising at least one load configured to utilize at least one product from said first fuel cell cluster;
(C) a power line connecting the first fuel cell cluster with the at least one load cluster, and a power line connecting the second fuel cell cluster with the at least one load cluster; and
(D) at least one resource management device, each configured to:
  compare a demand level of the load cluster with a first supply level of the first fuel cell cluster, wherein the demand level and the first supply level correspond to a set of at least one of the products of the first fuel cell cluster; and
  wherein when the demand level exceeds the first supply level, instruct adjusting or maintaining an operating level of the second fuel cell cluster such that the demand level is met by sharing the supply levels of the first fuel cell cluster and the second fuel cell cluster.

2. The aircraft resource management system of claim 1, wherein said one or more resource management devices comprise at least one of:
a load managing device;
a cluster load managing device;
a fuel cell cluster managing device;
a fuel cell cluster load management device;
a thermal management device; or
any combination thereof.

3. The aircraft resource management system of claim 1, wherein the one or more resource management devices are further collectively configured to at least:
instruct at least one fuel cell system of first or second fuel cell cluster to deactivate when the supply level of the first or second fuel cell cluster differs from the demand level by a first set amount or to activate when the demand level differs from the supply level of the first or second fuel cell cluster by a second set amount.

4. The aircraft resource management system of claim 1, wherein said load cluster includes a first load and a second load, wherein the one or more resource management devices are further collectively configured to at least:

determine a supply to the load cluster of a product from said first or second fuel cell cluster;

compare a first demand from the first load for the product to a second demand from the second load for the product;

instruct distributing at least a portion of the supply of the product among the first load and the second load based at least in part on the comparison of the first demand to the second demand.

5. The aircraft resource management system of claim 4, wherein the one or more resource management devices are further collectively configured to at least compare a first amount of the first demand to a second amount of the second demand.

6. The aircraft resource management system of claim 4, wherein the one or more resource management devices are further collectively configured to at least:

determine a difference in priority level between the first demand and the second demand; and instruct prioritized distribution based on the difference in priority level.

7. The aircraft resource management system of claim 1, wherein the one or more resource management devices are further collectively configured to at least:

instruct, when the supply level of the first or second fuel cell clusters exceeds the demand level for electrical power, at least a part of the electrical output of at least one fuel cell system of said first fuel cell cluster or said second fuel cell cluster or both to be at least one of:

A) stored in an electrical storage device;

B) directed to a water electrolysis device configured to receive the electrical output and separate water into hydrogen and oxygen using the received electrical output; or C) directed to one or more additional load clusters other than said load cluster.

8. The aircraft resource management system of claim 1, further comprising a catalytic burner configured to produce thermal energy, wherein said load cluster includes at least one thermal load configured to utilize at least thermal energy from at least one of said catalytic burner or said thermal product of said first fuel cell cluster or said second fuel cell cluster or both;

wherein the one or more resource management devices are further collectively configured to at least:

determine a thermal demand of said at least one thermal load for thermal energy;

determine a thermal supply level indicative of an amount of the thermal product produced by said first fuel cell cluster or said second fuel cell cluster or both;

determine a difference between the thermal demand and the thermal supply;

based at least in part on the difference between the thermal supply and the thermal demand, selectively instruct operation of said catalytic burner to produce thermal energy for said at least one thermal load.

9. The aircraft resource management system of claim 1, further comprising a catalytic burner configured to produce thermal energy, wherein said load cluster includes at least one thermal load configured to utilize at least thermal energy from at least one of said catalytic burner or said thermal product of said fuel cell cluster;

wherein the one or more resource management devices are further collectively configured to at least:

determine a thermal demand of said at least one thermal load for thermal energy;

determine a non-thermal supply level, the non-thermal supply level indicative of an amount of a non-thermal product that would be produced by said first fuel cell cluster or said second fuel cell cluster or both while producing an amount of thermal energy associated with the thermal demand, the non-thermal product including at least one of the water product, the oxygen-depleted product, and the electric product of the first fuel cell cluster or said second fuel cell cluster or both;

determine a non-thermal demand from the load cluster for said non-thermal product;

compare the non-thermal supply with the non-thermal demand;

selectively instruct operation of said catalytic burner based at least in part on the comparison of the non-thermal supply with the non-thermal demand.

10. The aircraft resource management system of claim 1, wherein said first fuel cell cluster comprises a first fuel cell system and a second fuel cell system, the aircraft resource management system further comprising:

said second fuel cell cluster comprising the second fuel cell system and a third fuel cell system;

wherein the one or more resource management devices are further collectively configured to at least one of:

instruct the first fuel cell cluster to provide one or more products from the second fuel cell system based on a determination that the first fuel cell system is producing an insufficient amount of products to meet a demand on the first fuel cell cluster; or instruct the second fuel cell cluster to provide one or more products from the second fuel cell system based on a determination that the third fuel cell system is producing an insufficient amount of products to meet a demand on the second fuel cell cluster.

11. The aircraft resource management system of claim 1, wherein at least one of the fuel cell systems in the first fuel cell cluster or the second fuel cell cluster or both is configured to operate at greatest efficiency.

* * * * *